United States Patent
Graves et al.

(10) Patent No.: US 7,035,541 B2
(45) Date of Patent: Apr. 25, 2006

(54) WAVELENGTH ARCHITECTURE AND IMPLEMENTATION FOR A PHOTONICALLY SWITCHED NETWORK

(75) Inventors: Alan F. Graves, Kanata (CA); John H. Watkins, Ottawa (CA)

(73) Assignee: Nortel Networks Limited, Montreal (CA)

( * ) Notice: Subject to any disclaimer, the term of this patent is extended or adjusted under 35 U.S.C. 154(b) by 693 days.

(21) Appl. No.: 09/870,665

(22) Filed: Jun. 1, 2001

(65) Prior Publication Data
US 2002/0181042 A1    Dec. 5, 2002

(51) Int. Cl.
*H04J 14/00* (2006.01)
(52) U.S. Cl. .............................. 398/68; 398/48; 398/57
(58) Field of Classification Search ................. 398/45, 398/48, 49, 50, 55, 56, 57, 66, 68, 69, 70, 398/71, 73, 79
See application file for complete search history.

(56) References Cited
U.S. PATENT DOCUMENTS 5,058,101 A * 10/1991 Albanese et al. ............. 398/73
5,221,983 A * 6/1993 Wagner .......................... 398/72
5,717,795 A * 2/1998 Sharma et al. ................ 385/24
6,426,815 B1 * 7/2002 Koehler ........................ 398/59
6,657,757 B1 * 12/2003 Chang et al. ................ 370/471

OTHER PUBLICATIONS

Kartalopoulos, S.V.;.("Introduction to DWDM Technology", IEEE Press, 2000; p. 175.*

* cited by examiner

*Primary Examiner*—Agustin Bello
*Assistant Examiner*—Nathan Curs (57) ABSTRACT

The photonic network of the present invention uses a cost-effective DWDM optimized switch architecture allowing the introduction of DWDM into the metro network. In this invention the optical carriers are all generated in the photonic layer at the edge photonic switching node and are allocated out to the photonic access nodes or central core data switch for modulation. This has the advantage of providing the optical carriers to be modulated from a centralized highly stable and precise source, thereby meeting the requirements for DWDM carrier precision, whilst generating these carriers in relatively close proximity to the modulators. Sparse WDM components can be used in the access portion of the network without adversely affecting the ability of the signal to transit the DWDM portion of the core network, since the optical carrier frequency is fixed at the centralized source and is unaffected by these components.

37 Claims, 8 Drawing Sheets

WAVELENGTH ARCHITECTURE AND IMPLEMENTATION FOR A PHOTONICALLY SWITCHED NETWORK

FIELD OF THE INVENTION

The present invention relates to wavelength architectures and implementations for a photonically switched network and is particularly concerned with metropolitan area networks.

BACKGROUND OF THE INVENTION

A photonic network requires precisely controlled (in optical carrier frequency) modulated optical carriers from the customer premises for a DWDM core photonic network to be viable. In prior art solutions, all optical carriers are locally generated at the access point. If fixed optical carrier frequency lasers are used, network engineering of distribution of laser wavelengths must be mapped out on a network-wide basis. Alternatively, individual tunable lasers can be used at all access points, providing greater flexibility in network engineering at a significant increase in hardware costs, and a need to introduce remote optical frequency provisioning.

SUMMARY OF THE INVENTION

According to an aspect of the present invention optical carriers are centrally generated, in a location, with a benign environment, where the equipment can be shared and can be synchronized to a reference optical frequency, and then those optical carriers are distributed out to network edge equipment where they can be modulated and returned to the DWDM core network for transmission across that network.

According to an aspect of the present invention optical carriers for use in a DWDM photonic switched network are all generated in the photonic layer at intelligent hub/switching nodes and are allocated out to the photonic edge devices for modulation. The present invention benefits from not needing any individual tunable or wavelength administered sources in the access equipment/photonic edge equipment saving both the costs of the sources and of the remote administration system to set up and monitor those sources. However such sources (e.g. from third party equipment) can be accommodated as long as they meet DWDM frequency/wavelength precision and stability requirements, and means is provided to remotely provision them from the photonic network. The centralized sources facilitate the generation of ultra-precise optical carriers, due to the ability to use more expensive or sophisticated techniques in a shared structure, and the ability to synchronize such a source to a network reference optical frequency that can be made available in the central office. These precise frequency optical carriers are required for optimum DWDM performance and can be shared over multiple edge devices by power splitting, amplification and should result in a lower network cost and simpler lambda administration.

BRIEF DESCRIPTION OF THE DRAWINGS

These and other features of the invention will become more apparent from the following description in which reference is made to the appended drawings in which.

DETAILED DESCRIPTION OF THE PREFERRED EMBODIMENT

Figure 1:
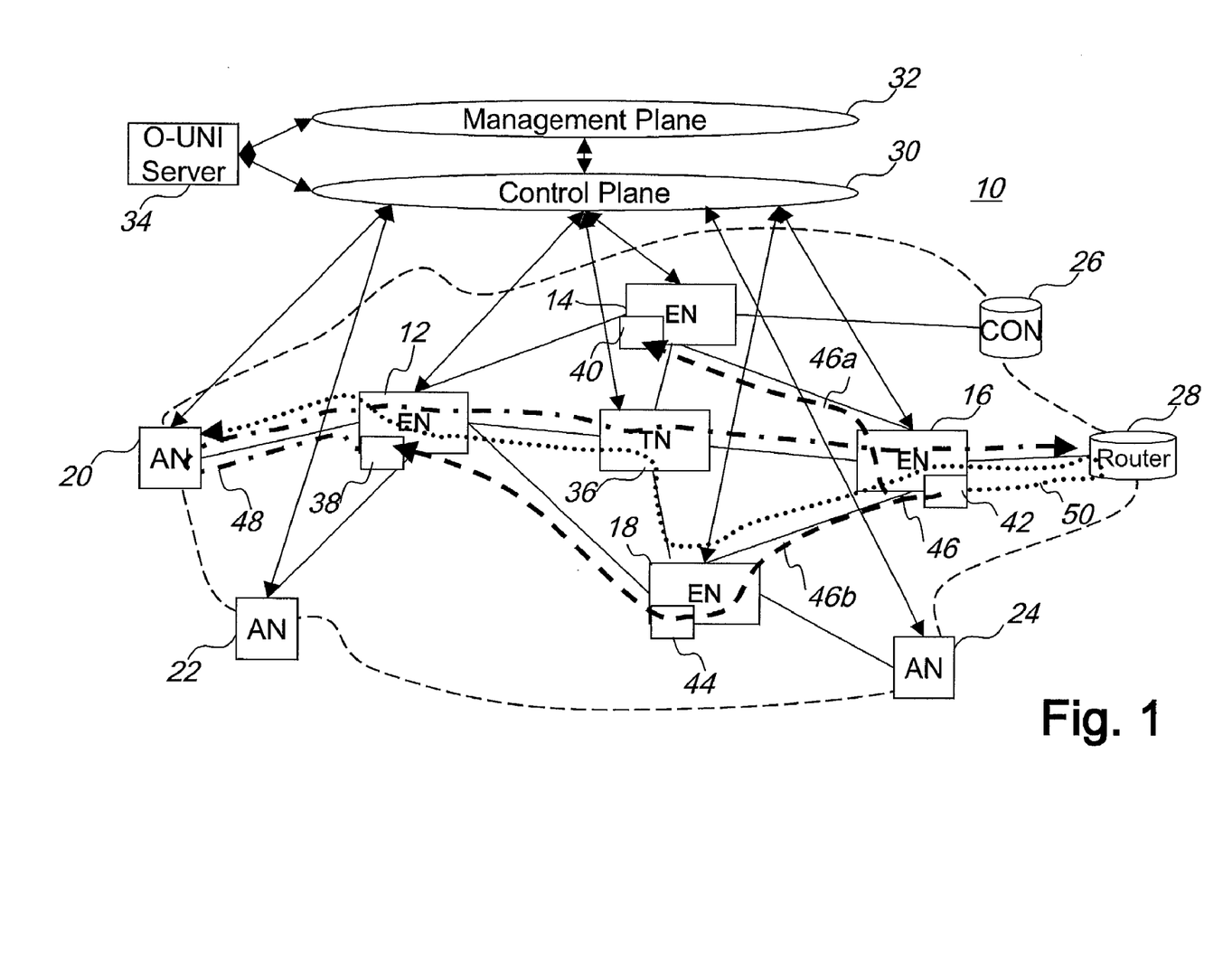
FIG. 1 illustrates in a block diagram a photonic network capable of using an embodiment of the present invention.

Referring to FIG. 1, there is illustrated in a block diagram a photonic network capable of using an embodiment of the present invention. The metropolitan photonic network 10 includes a plurality of network nodes in the form of metropolitan photonic nodes 12, 14, 16, 36, and 18 providing edge node, tandem node or mixed edge/tandem node functionality which are interconnected to form an optical mesh network. The edge nodes are connected to access nodes that terminate the optical network, for example photonic edge nodes (EN) 12 and 18 are coupled to access nodes 20 and 22, and 24 respectively, while edge nodes 14 and 16 are coupled to content switch 26 and MPLS router 28, respectively. All network nodes are coupled to a network control plane 30, which is itself coupled to a management plane 32. By way of example an Optical UNI server 34 is shown coupled to the management and control planes 30 and 32. These planes also interface with other applicable protocol servers as appropriate for the network configuration (e.g. Internet Protocol, Ethernet). Each edge node 12, 14, 16, and 18 includes a multi-lambda carrier source 38, 40, 42, and 44, respectively.

In operation, network 10, when implementing an embodiment of the present invention, provides network end-to-end transport based upon the allocation of optical carriers of specific wavelengths and implement the distribution of the appropriate optical carriers to achieve the required end-to-end wavelength path connection across the network. Access node #X (or router #Y) requests a cross-network path. The control-plane notifies the individual edge nodes and tandem nodes either the required path end point and lets them collaborate to find an available end-to-end path to achieve this connection (this is the optical network controller (ONC)), contract manager model as described in co-pending U.S. application Ser. No. 09/453,282 entitled "Architectures for Communications Networks", filed Dec. 3, 1999 assigned to the Assignee of the present invention) or the management/control plane determines an end-to-end path, including cross-connections in the edge nodes and lambdas to use, and notifies the affected nodes, which set up the path in a slave mode. The edge nodes then set up the correct connections and the adjacent lambda source feeds the correct lambda to the access node #X. The access does not know what wavelength it is using. Once complete the access node is notified that its lambda-path is in place.

The optical carrier to be modulated is provided as a clean optical carrier, along with the downstream data on a separate optical carrier. There may be some coordination between the optical carriers to simplify the provisioning process, e.g. odd lambda downstream gets next highest lambda upstream or even lambda downstream gets next lower odd lambda upstream . . . this allows all lambdas to be used. For example, a designated multi-lambda carrier source 42 generates a reference lambda carrier 46, which is sent to all remaining multi-lambda carrier sources in the network, 46a going to the multi-lambda carrier source 40 and 46b going to multi-lambda carrier sources 44 and 38. These multi-lambda carrier sources then generate their multi-lambda carriers with reference to carrier 46. For example, the multi-lambda carrier source 38 of edge node 12 generates a carrier 48 and the multi-lambda carrier source 42 of edge node 16 generates a carrier 50.

The detailed structure of the switch edge-facing or access-facing port card depends upon the actual wavelength allocation methodology, and the required network and hence node functionality, but all approaches use the method of providing the originating optical carrier at a specific wavelength as laid out herein. The control plane 30 and management plane 32 both couple across to the Ethernet control, management planes as well as to the Optical UNI server 34 (Optical User-Network Interface Server). The photonic network 10 is quasi-autonomous, and configures its wavelength paths based upon requests for end-to-end connectivity passed to the O-UNI Server. This server then notifies each node of the required new end-to-end path and the nodes co-operate to establish such a path. Such operation permits simplification in layer 2, 3 (L2, L3) network topology by permitting reconfigurable bypass and cost effective access to centralized network L2 and L3 resource. An end-to-end lambda provisioned photonic network greatly reduces component count seen in opto-electronic hybrid networks. For example in traversing the network of FIG. 1 from access node 20 to access node 24 (i.e. 20, 28, 26, 44 to 24), there are only two optical transmitters and two optical receivers over the entire path, down from 8 of network nodes with electrical switching cores were used.

The photonic network 10 implementing an embodiment of the present invention uses a cost-effective DWDM optimized switch architecture, which provides the opportunity to introduce both enormous growth and bandwidth-carrying capacity of DWDM into the metro network. In order to implement this architecture we need to provide cost-effective ways of implementing the optical carriers with the frequency or wavelength precision required for a 100 GHz or even 50 GHz on-grid DWDM solution. This has two aspects, one being the precision of the DWDM (dense wavelength division multiplexing), DWDD (dense wavelength division demultiplexing) actual multiplexing, demultiplexing elements and the other being the precision generation of the optical carriers themselves, since these optical carriers have to be centered in the passbands of the individual DWDM channels, if their modulation sidebands are to pass through the DWDM path without significant impairment.

DWDM multiplexers and demultiplexers are rapidly falling in cost and complexity as Array Waveguide technology matures to the point of offering adequate performance. This technology results in a single chip monolithic part that can be manufactured using a silicon wafer processing plant and techniques. Furthermore such parts exhibit accuracies to a few GHz in commercially available devices, making 50 GHz and 100 GHz DWDM applications of this technology highly viable. Such parts often have relatively flat passbands of about +/−12–20 GHz either side of their center frequency. Given that the modulation sidebands may extend out—10 GHz either side of the carrier, this leaves little margin for the combined effects of DWDM filter drift and optical carrier frequency drift, leading to a requirement for a very precise and hence very expensive optical carrier source. Such sources could be placed in the AN's but would then have to be provisioned individually, and would be hard to synchronize due to their remote location.

Drawbacks of Locating Sources in ANs
Number of sources needed→central location requires fewer if splitter & amplifiers are used
Inability to lock, sychronize
Need for lambda-provisioning, which means the AN becomes lambda-aware.
Need for lambda verification to check that the AN source has been correctly set.
Potentially a hostile environment, especially in the external outside plant or some CLE equipment rooms.

Figure 2:
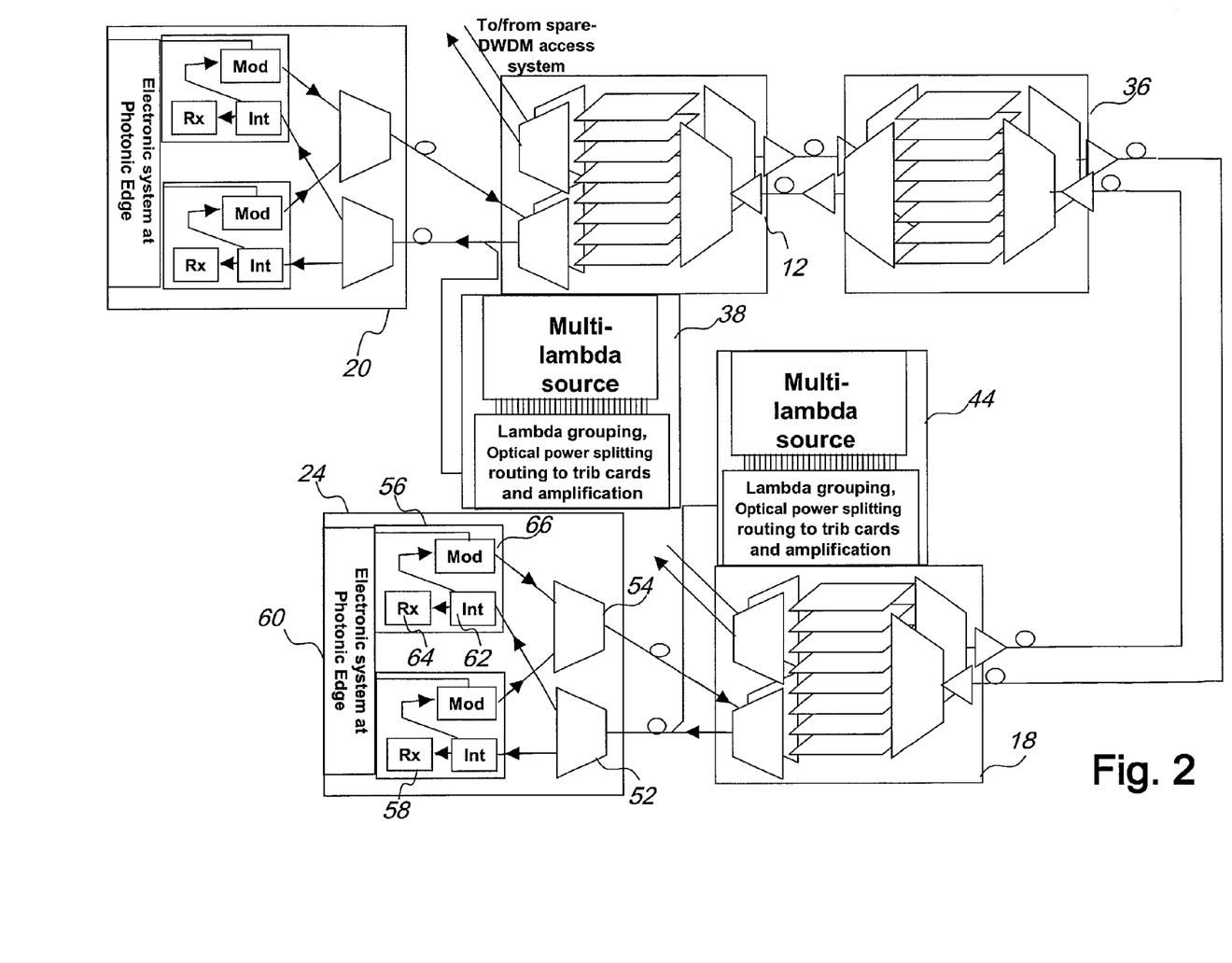
FIG. 2 illustrates in a block diagram a portion of the photonic network of FIG. 1 in accordance with an embodiment of the present invention.

Referring to FIG. 2, there is illustrated in a block diagram a portion of the photonic network of FIG. 1 in accordance with an embodiment of the present invention. In addition to the network elements shown in FIG. 1, FIG. 2 includes more detail for the tandem node or central photonic switch 36 and multiple lambda sources 38 and 44 coupled to edge switching nodes 12 and 18, respectively so that the optical carriers only have to transit the access plant (typically 1–3 km) and none of the interoffice trunks (typically 10–20 km), which would give too long a path. The individual multi-lambda sources may be kept synchronized by distributing a reference wavelength.

One elementary instantiation of the access nodes 20 end 24 is shown in greater detail. With respect to access node 24 there is included therein demux 52 and mux 54 DWDM transponder 56 and 58 and electronic interfaces 60. Each DWDM, transponder for example 56, includes an interleaver 62 a receiver 64 and a modulator 66. The WDM demux and mux only need to be of sufficient quality to handle coarse WDM, i.e., having a grid spacing of 500 GHz rather than the 50–100 GHz spacing of DWDM. However the access node of the present embodiment can actually be considered to be operating in a "sparse DWDM" mode since the access node uses lambdas of DWDM precision, to be compatible with the DWDM core network, but spaced apart like CWDM, to simplify the access technology.

In operation, all the optical carriers at the various required specific wavelengths needed throughout the metropolitan photonic network 10 are all generated in the photonic layer at edge switching nodes, for example edge nodes 12 and 18 and are allocated out via the edge nodes to the access nodes for modulation.

An unmodulated optical carrier is sent to the access node 24 along with a modulated carrier. The interleaver 62 separates the modulator carrier from the unmodulated one. Typically these would be adjacent wavelengths in the multi-wavelength distribution plan. The modulated wavelength then is passed to the receiver 64 where it is detected and thereby converted from an optical signal to an electrical signal. The unmodulated optical carrier is passed to the modulator 66 where it is modulated by an electrical signal to produce a modulated wavelength for transmission of data back to the photonic switch 18.

Hence, according ti an embodiment of the present invention to ensure that the upstream wavelength is both the correct wavelength and is of sufficient precision to enter the DWDM network, the access node is provided with an optical carrier it is to modulate, from the central multi-lambda source 38 to 44. This has the benefit of being substantially cheaper and simpler to implement by eliminating both the need for a complex DWDM individual source in the access node and the need to provision wavelengths in that equipment and monitor for compliance. In effect, the access nodes become optical frequency agnostic and dumbly modulate whatever wavelength the core photonic network sees fit to give them.

The centralization of the sourcing of the optical carriers allows six major other benefits in their generation. These are:

1. Ability to lock to a central network-wide lambda reference
2. All the optical carriers can be generated in close physical proximity, opening up the possibility of sharing some of the equipment needed to generate them or to stabilize them, lock them, or to monitor them.
3. Each optical carrier can be used multiple times on different access fibers by splitting and amplification.
4. The optical carriers can be generated in a benign central office environment, even when feeding an outside plant located access multiplexer, resulting in less environmental stress on the design. If necessary, locking the carriers to a reference wavelength can be employed.
5. There need not be any individual tunable or wavelength administered sources in the access nodes, although such sources (e.g. from third party equipment) can be accommodated as long as they meet DWDM frequency/wavelength precision and stability requirements. The centralized sources can be shared over multiple edge nodes by power splitting, amplification and may result in a lower network cost through simpler lambda administration.
6. The centralized, central-office located multi-lambda source can readily be fed with a synchronization optical carrier of a specific wavelength or frequency, distributed throughout the interoffice network for this purpose.

While FIG. 2 shows a wavelength plane switch, it should be understood that any photonic switch structure that can achieve full connectivity, between all the ports that can be interconnected in a DWDM node, can be used.

Figure 3:
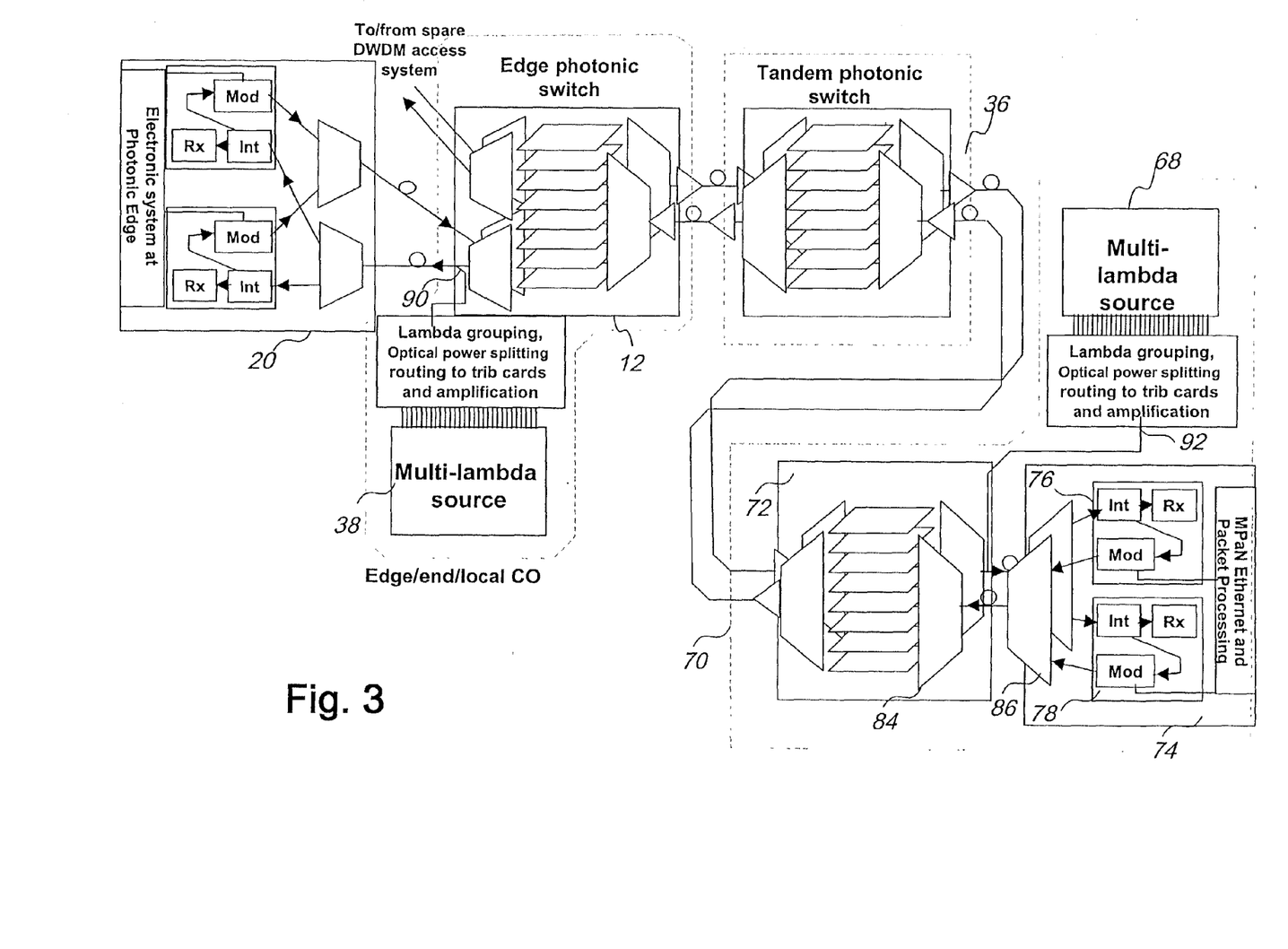
FIG. 3 illustrates in a block diagram a portion of the photonic network of FIG. 1 in more detail in accordance with another embodiment of the present invention.

Referring to FIG. 3 there is illustrated in a block diagram a portion of the photonic network of FIG. 1 in accordance with another embodiment of the present invention, in addition to the network elements shown in FIGS. 1 and 2, FIG. 3 includes a central core node 70 including a photonic node 72, similar in structure to the tandem node 36 and a metropolitan packet node (or code router) 74 with the central multiple lambda source 68 coupled thereto. As previously shown an access multiple lambda source 38 is coupled to the edge node 12. The core router 74 has associated DWDM transponders 76 and 78 that operate in a similar manner to those described with regard to the access node 24. A coupler, interleaver or other multiplexing device 90 connects the multi-lambda source 38 to the edge node 12 and a coupler, interleaver or other multiplexing device 92 connects the multi-lambda source 68 to the core node 70. This could be via extra ports of downstream DWDM or even through the switch, but doing so would use up one third of the switch ports. The combining could be done on the downstream portion of the access line card of the switch. For example, in an 8 channel sparse DWDM scenario, we would provide 8 wavelength WDM upstream, and 8+8 channel WDM downstream, where 8 channels are switched through the switch and are modulated with traffic to the AN's and 8 channels are unmodulated carriers from the MLS to be turned round and modulated. These can be passed through 16 ch WDM filters downstream or through broad-lobed 8 channel parts, with both unmod and mod carriers passing through the same lobe.

In operation, optical carriers at all required wavelengths or optical frequencies are all generated in the photonic layer elmer adjacent the core nodes, for example central core node 70 or adjacent the edge photonic switches, for example edge photonic switch 12. The access optical carriers at the required wavelengths are allocated out to the photonic access nodes for modulation from the access multiple lambda source 38 coupled to the edge node 12. Similarly, the core wavelengths are coupled to the core node 70 for modulation. This embodiment of the present invention has the further advantage of providing wavelengths to be modulated in relatively close proximity to the modulators. In the present embodiment, the closest the optical gets to the modulator is the other end of an access fiber. The optical source suffers some degradation when being transmitted over this fiber, because the signal level of the optical carrier will be attenuated, however other impairments such as chromatic dispersion are irrelevant since there are no modulation sidebands to disperse on the downstream optical carrier transmission prior to modulation. According to this embodiment of the present invention, to ensure that the upstream wavelength is both the correct wavelength and is of sufficient precision to enter the DWDM network, the access modulator is provided with an optical carrier it is to modulate, from the access multi-lambda source 38. similarly, to ensure that the downstream wavelength is both the correct wavelength and is of sufficient precision to transit the DWDM network, the core node modulator is provided with an optical carrier it is to modulate, from the central multi-lambda source 68.

The core node 70 provides a large service-aware node function needed to handle the partitioning of traffic on a per-service and per-carrier level at the entry to the multiple long-haul networks, and to provide packet-level and sub-lambda level circuit services within the metro area.

The core node acts as a hub for the subtending Metro Photonic Nodes (MPSN's) that provide a flexible and potentially agile method of mapping capacity from the edge nodes to the core nodes.

Figure 4:
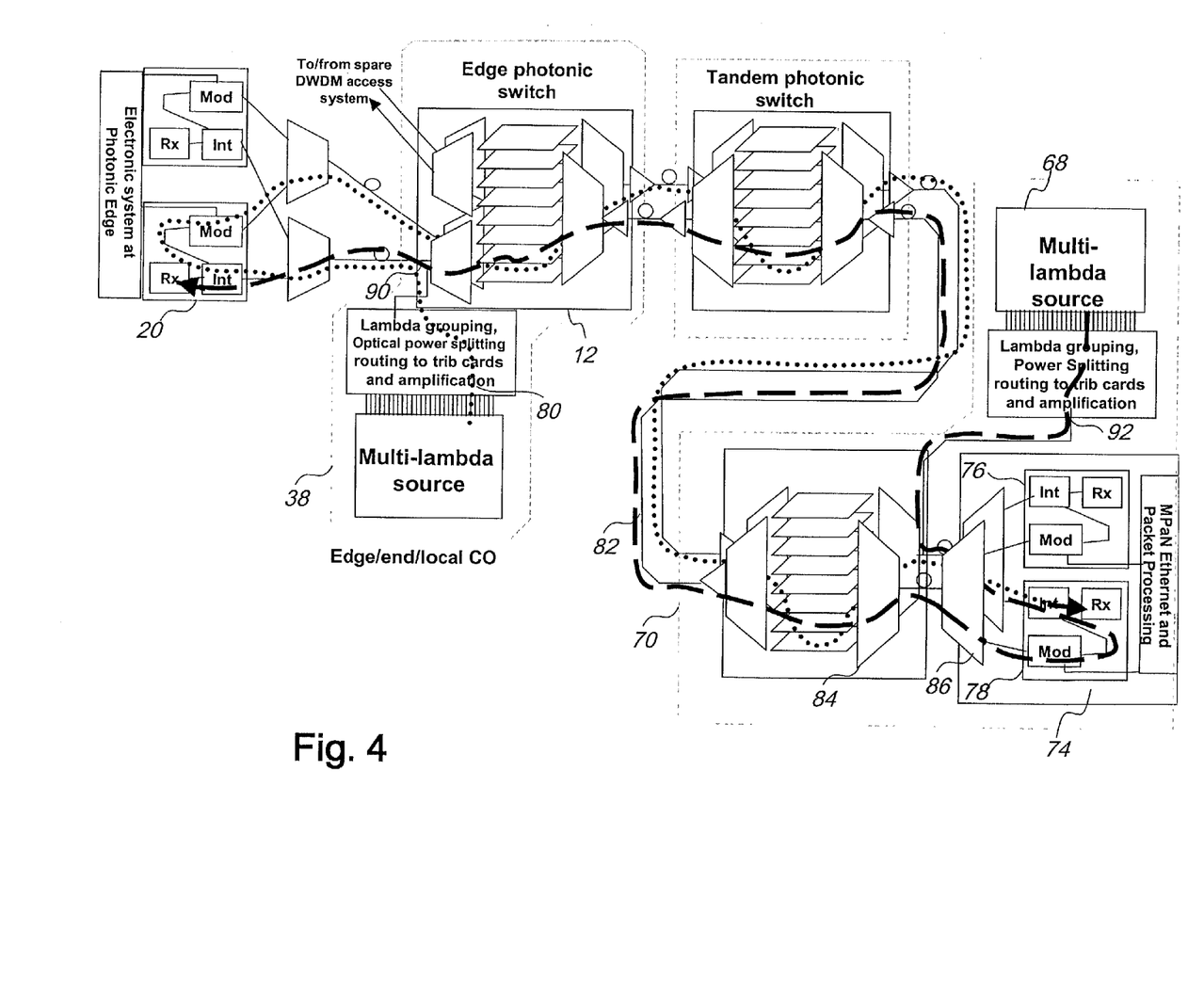
FIG. 4 illustrates in a block diagram a of example wavelength distribution in the photonic network of FIG. 3.

By providing multi-lambda source as central wavelength resource the edge nodes:

Permit passive modulation at the customer premises by providing the required precise optical carrier to the CPE, instead of demanding that a high precision DWDM-compatible tunable laser be provided Eliminate/automate lambda provisioning since, with the removal of that laser, the residual components can be optical frequency agnostic Referring to FIG. 4 there is illustrated by way of example wavelength distribution in the photonic network of FIG. 3. An optical path is shown in FIG. 4. The upstream (edge to core) wavelength 80 is generated at the edge-located MLS 38, so that the extra optical path length is minimized, being one extra traverse of the access fiber plant, the signal being in an unmodulated state and hence not suffering from most of the degradations (e.g. chromatic dispersion) that it will be prone to be affected by once it has been modulated at 1 GE or 10 GE. Nevertheless this extra optical path length does add some small degree of impairment which must be accounted for in the system optical link budget. The downstream optical path 82 originates with the MLS 68 located in the same office as the core router 74 and is also hair-pinned through the port cards of the optical switch 70 before being fed to the DWDM transponders 76 and 78 associated with the core router.

The example shown in FIGS. 3 and 4 have the edge node 12 (metropolitan photonic switch) with subtending access multiplexer equipment, access node 20 operating over sparse-DWDM links. The optical carriers to be used by the access multiplexers are generated in the Multi-Lambda Source 38 and are grouped into the appropriate groups according to the wavelength plan in use over the sparse-DWDM plant. The resultant multi-carrier carrier groups are distributed to the port cards via splitters with amplification, which will be discussed later. The purpose of the multi-lambda generator 38 at the edge node 12 is to collect the lambda sources from a large number of distributed locations into a centralized one and to share resources effectively. The output DWDM feed and input DWDM feed to the edge node is connected to, and switched through a single tandem node 36 (but this can be repeated a number of times, typically up to an upper limit in the 5–10 range). After passing through a number of tandem photonic switches, as represented here by the tandem node 36, the DWDM optical path 80 terminates on the core router switch 76, after first passing through the associated photonic node 72.

Here again the optical sources are combined into a Multi-lambda Source 68 for economies of scale. In this case for a 40 channel DWDM network a maximum of 40 sources are required (one per wavelength actually used in the network), whereas, if we considered a 1 Tb/s router with 10 Gb/s interfaces 100 sources (one per interface) would be required in an implementation using discrete sources. For a 5 Tb/s router this would increase to 500 sources (one per interface) for the discrete approach versus a maximum of 40 for the MLS approach and for the extreme case of 1 GE interfaced 5 Tb/s routers, this would increase to 5000 sources versus a maximum of 40 for the MLS approach (but the fan-out is getting very high which may lead to more than one MLS). Hence both directions of optical carrier are generated by MLS 38 and 68 and keeping wavelengths within the optical frequency tolerances for successful DWDM operation is much simpler that is the case where individual wavelength sources are placed in multiple line cards in the central core switch and multiple multiplexer locations each contain individual DWDM sources in often less than benign environments. At the access end of the network there is one centralized source for every optical carrier frequency required (typically 1–40), whereas placing tunable sources at the customer premises equipment would result in one tunable source per multiplexer wavelength output, which, on a 640 port switch might be as high as 640 individual tunable lasers, each remote from the DWDM switch and requiring a remote management system to keep them and a monitoring system at the DWDM switch input to ensure that the incoming wavelength is in the right channel and is precisely aligned with that channel.

Figure 5:
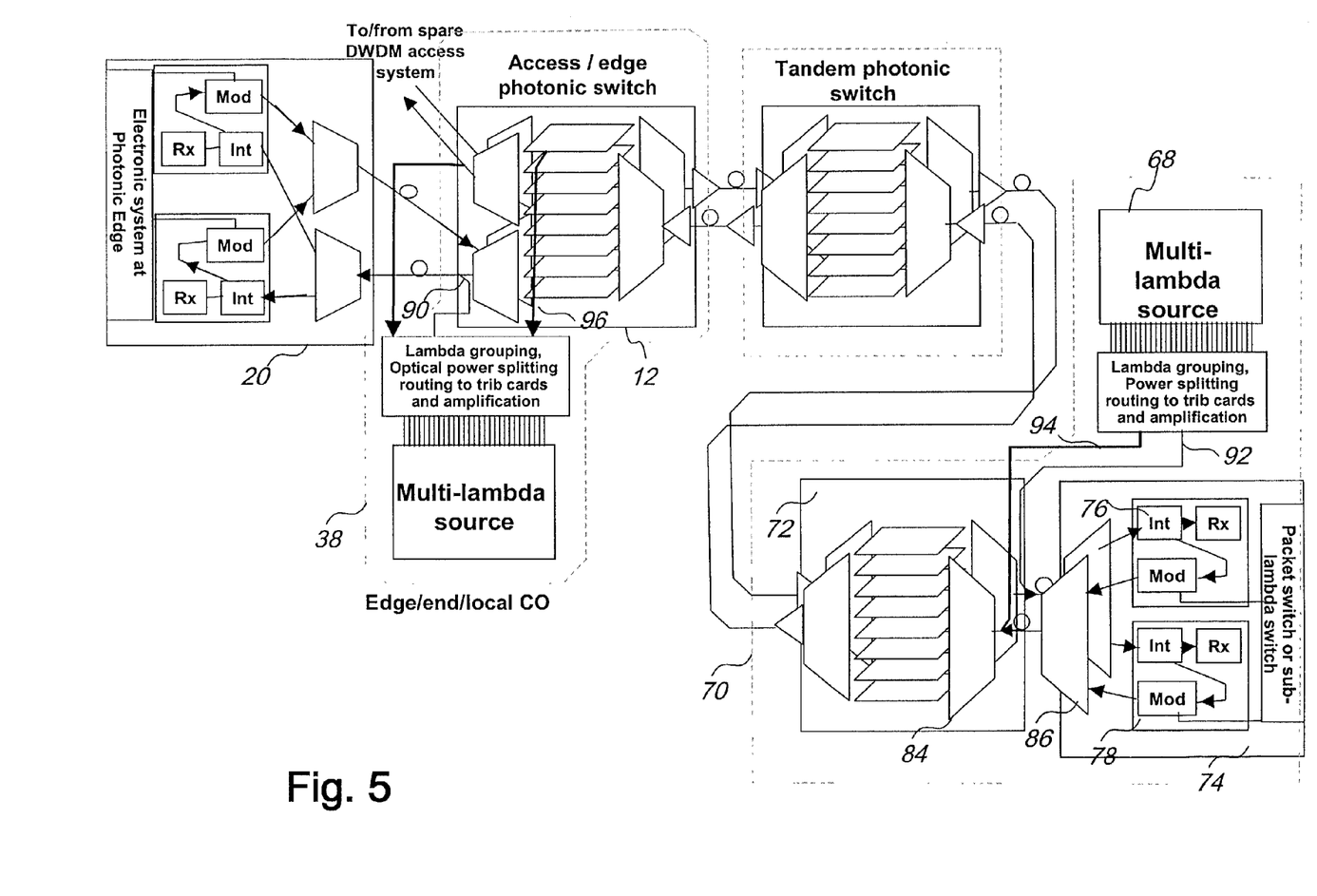
FIG. 5 illustrates in a block diagram a portion of the network of FIG. 1 in accordance with a further embodiment of the present invention.

Referring to FIG. 5 there is illustrated in a block diagram a portion of the photonic network of FIG. 1 in accordance with a further embodiment of the present invention. The embodiment of FIG. 5 is similar to that of FIG. 4, except that FIG. 5 includes distribution of synchronization wavelength via a coupler, interleaver or other multiplexing device 94 that connects the multi-lambda source 68 to the core node 70. While only a single connection is shown, in a practical implementation at least two, possibly three injection points to protect against distribution failure. Injection points could be in lieu of a lambda 1 transponder at end (not shown) or by not provisioning lambda 1 transponder and optically jacking in a reference carrier (shown). A synchronization carrier (e.g: lambda 1, or lambda 20, depending on design) is injected into some ports. On ports where no sync carrier is injected, the wavelength can be used for traffic. The applicant's co-pending application filed on the same day as the present application (14041ROUS01U) provides a synchronization scheme.

The synchronization carrier can be extracted from the WDM output 96 of an edge port card or directly off of the switch, e.g. from the third MEMS port in a 3-port or 4-port MEMS, or by a tap/switch on the port card prior to the output DWDM (not shown in FIG. 5).

Figure 6:
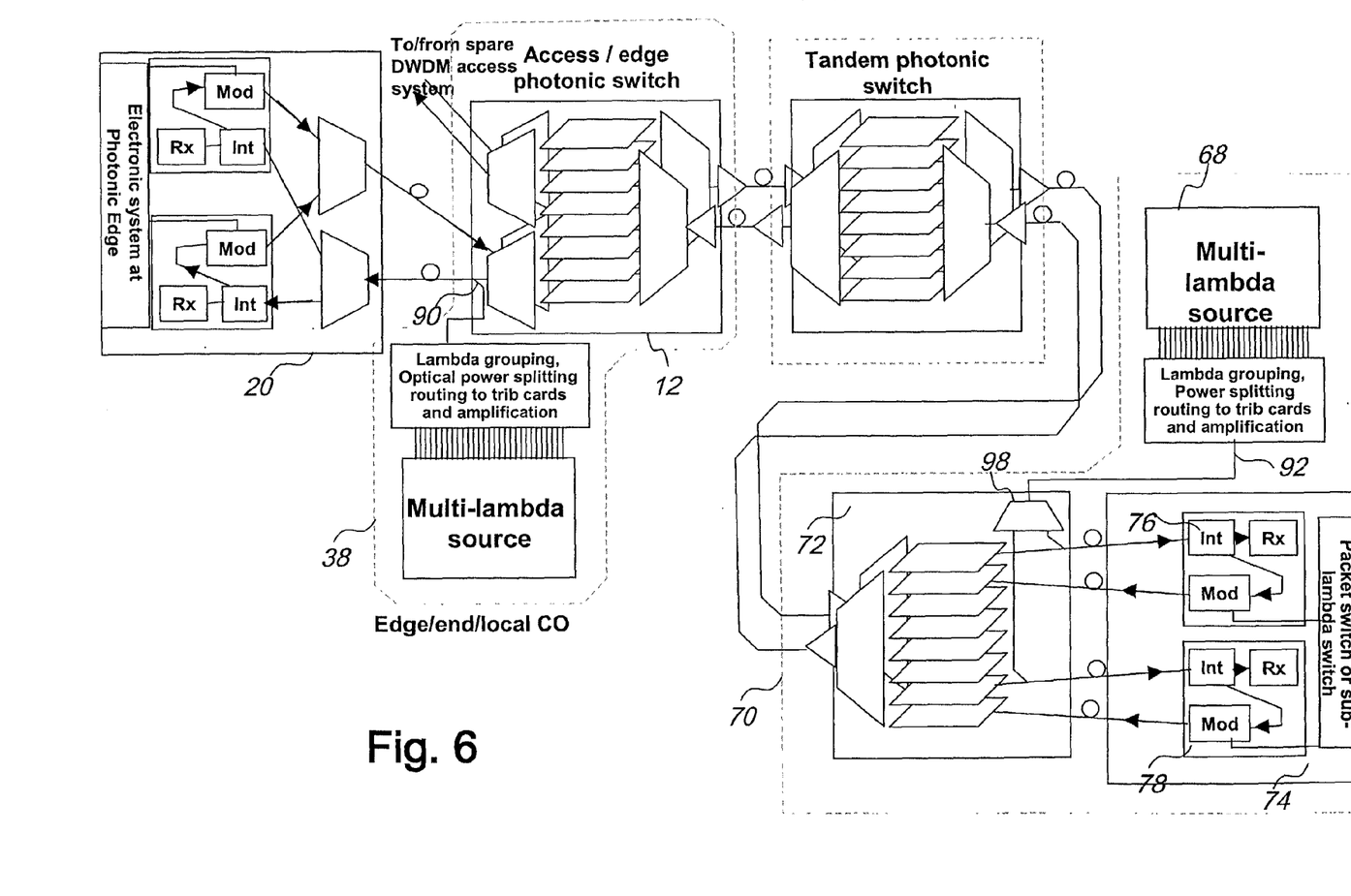
FIG. 6 illustrates in a block diagram a portion of the network of FIG. 1 in accordance with a further embodiment of the present invention.

Referring to FIG. 6 there is illustrated in a block diagram a portion of the photonic network of FIG. 1 in accordance with a further embodiment of the present invention. FIG. 4 shows back-to-back DWDM 84, DWDD 86 separated by the office cabling length, however if the transponders 76 and 78 are close to the photonic switch 72 this back-to-back DWDM 84, DWDD 86 can be dispensed with, with direct transponder-photonic switch interconnection via a much simpler port card as shown in FIG. 6. This would result in a simpler, lower stress optical budget. A DWDD 98 is provided if 92 is a single fiber for the optical carrier feeds from MLS. Optionally, DWDD 98 can be omitted if 92 is a ribbon fiber cable or similar short reach low cost optical interconnect technology providing individual optical carrier feeds from MLS to couple the optical carriers to the optical links to transponders 76 and 78. Other WDM, non WDM interface structures are also possible, at both or either ends of the system.

Figure 7:
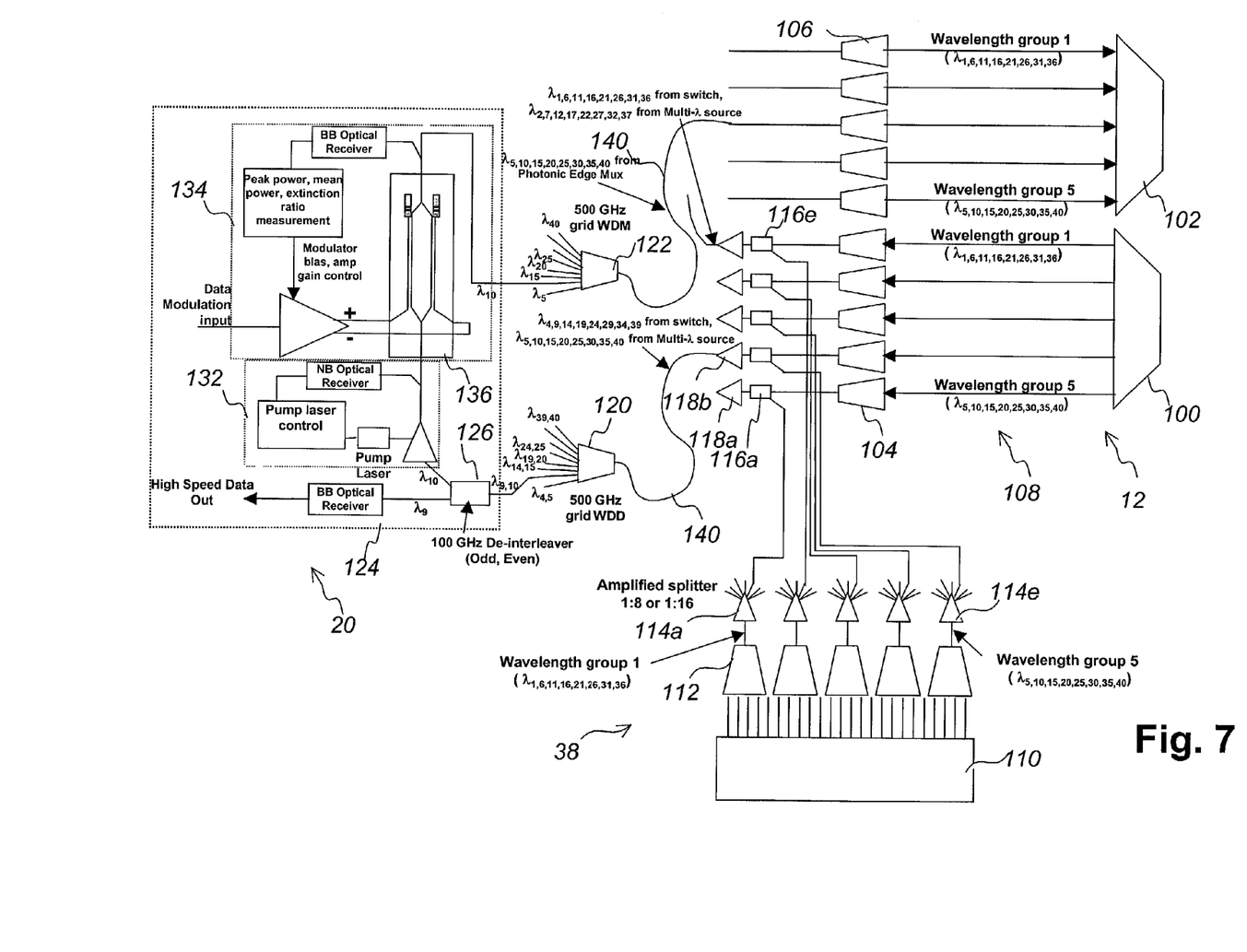
FIG. 7 illustrates in more detail, a portion of the network of FIGS. 1–6 showing wavelength distribution at the access portion thereof.

Referring to FIG. 7, there is illustrated, in more detail, a portion of the network of FIGS. 1–6 showing wavelength distribution at the access portion thereof. The network portion includes edge node 12, access node 20 and multiple lambda source 38, each shown in further detail to illustrate lambda distribution in the access portion of the network. The edge node 12 includes a DWD demultiplexer 100 and DWD multiplexer 102 on the dense wavelength distributed (DWD) core side of the network and plural sparse DWD multiplexers 104 and demultiplexers 106 on the access side of the network. The optical plane switches of access node 12 are represented by arrows 108 to reduce the complexity of the drawing. The access node 20 includes sparse-DWD (500 GHz grid) wavelength distributed demultiplexer 120 and multiplexer 126, a broadband optical receiver 128 and an output for high-speed data 130. The optical port card 124 also includes a carrier power stabilization loop 132 and a modulation depth and power stabilization loop 134. The modulation loop 134 includes a modulator 136.

In operation, the Multi-Lambda Source 38 generates 40 optical carriers on the standard ITU 100 GHz grid (or whatever other spectral plan is to be adopted). The wavelengths from the MLS 38 are grouped or multiplexed by multiplexers 112 into 5 groups of 8 wavelengths that are of the same wavelength composition as the downstream sparse-DWDM frequency plan on the access side of the edge node 12. These groups are fed through amplifying splitters 114, (such as an amplifying 8-way splitter such as that manufactured by TEEM Photonics, of Grenoble, France). The individual optical feeds are fed into the appropriate outgoing ports via a coupler or interleaver device 116. It is important to note that, for the access fiber port with "wavelength plan 1" downstream wavelengths, the unmodulated wavelengths from MRS 38 are not from wavelength plan 1, since this would overwrite the downstream data, but are from one of the other wavelength plans 2–5. In the present example wavelength plan 2 is used for the unmodulated carrier wavelengths. This results in eight groups of two wavelengths (one being a downstream signal, the other an unmodulated carrier) being generated with an inter-group spacing of 500 GHz (allowing relatively coarse demultiplexers 80 in the outside plant), with an inter-carrier spacing between the two carriers in the group being a constant 100 GHz. The entire optical structure consisting of eight 500 GHz spaced downstream data streams and eight downstream unmodulated carriers is propagated over the outside plant fiber plant, for example optical fiber 140, to the far end optical sparse-DWDM demultiplexer 120, a 500 GHz channelized optical demux, that drops lambdas 9 and 10 into the optical port card 124 of access node 20. The 100 GHz grid optical interleaver 126 (a recursive optical device such as a resonant cavity) separates the two wavelengths lambda 9 and lambda 10. Lambda 9 carries the downstream data and is fed to the downstream optical data receiver 128, received, converted into an electronic signal and passed via the output 130 into the access node electronic circuitry (not shown in FIG. 7).

Meanwhile lambda 10, being the optical carrier for the upstream path is passed to the modulation area of the upstream transmitter. The optical carrier lambda 10 passes through the carrier power stabilization loop 132 to ensure that a constant known power level is passed into the modulator 136. The modulator 13 can take many forms, such as an electro-absorbsion modulator, but the modulator shown here is an electro-optic Mach-Zehnder modulator, that can be implemented in Lithium Niobate or as an electro-optic polymer modulator. The modulator also operates within a series of feedback loops, forming the modulator depth, power stabilization loop 134, the nature of which is determined by the properties of the chosen modulator technology. Typically, with a MZ modulator 136, there is a peak power control and an extinction ratio control, controlling the brilliance of "1"s and the closeness to darkness of "0"s, respectively. The output from this passive modulator is then fed through an inverse of the incoming optical demultiplex, in the same wavelength port as before and is fed via optical fiber 142 upstream to the edge node 12. Here the upstream modulated lambda 10 is passed through an access-side port card (not shown in FIG. 7) to the switch core and is coupled straight into the outgoing DWDM multiplexer 108 of the switch. The optical carrier must be of a frequency that directly aligns to the outgoing grid.

Figure 8:
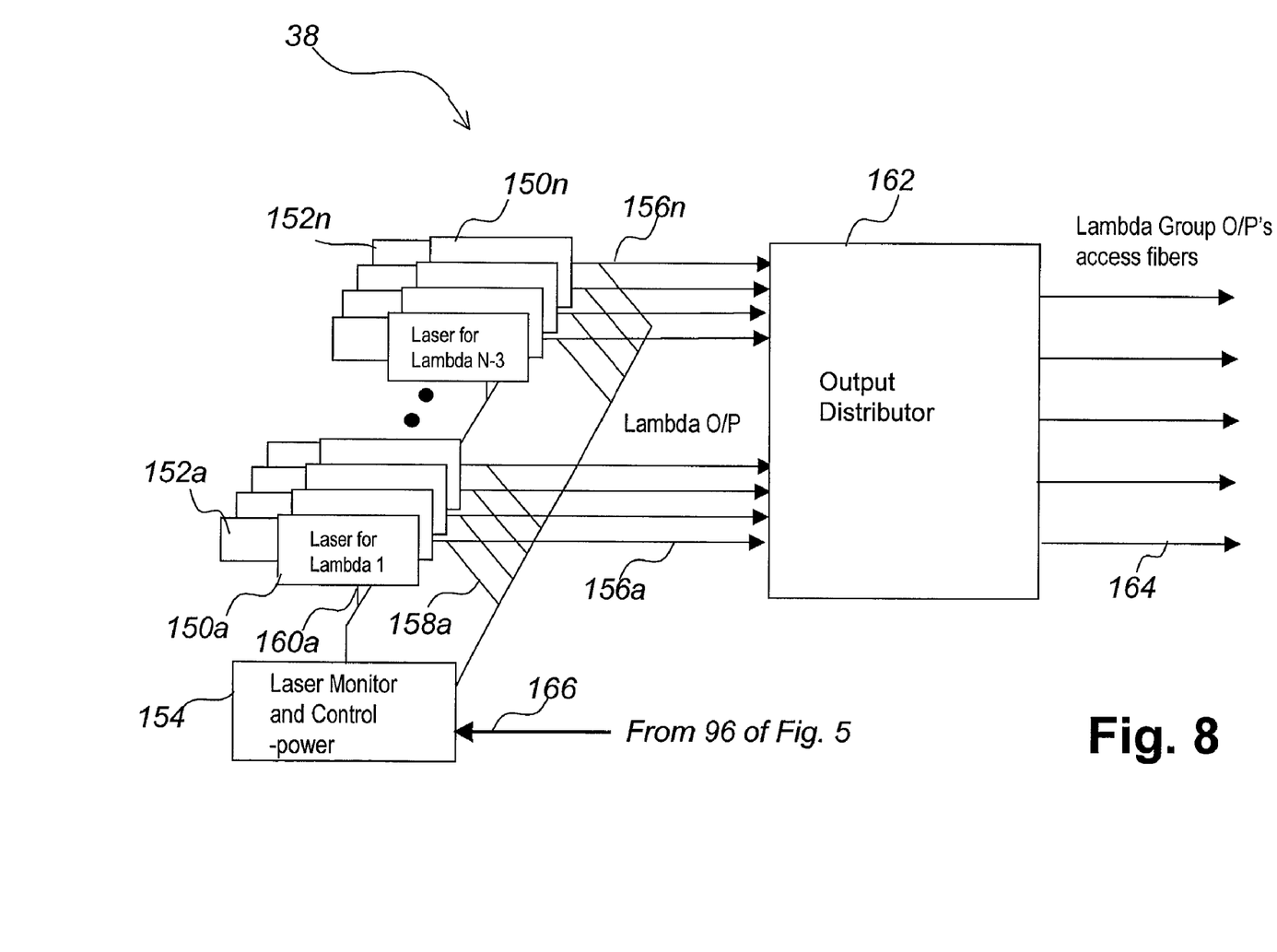
FIG. 8 illustrates an example of a multi-lambda source, suitable for use in the network illustrated in FIGS. 1–7.

Referring to FIG. 8, there is illustrated an example of a multi-lambda source, suitable for use in the network illustrated in FIGS. 1–7. The multi-lambda source (MLS) 38 includes a plurality of tunable lasers 150*a–n*. Each tunable laser 150 includes an elaton lack-resonant cavity 152 and a laser controller 154. Each laser 150 includes an output 156 each having a tap 158 coupled to the laser controller 154 and an input 160 coupled to an output of the laser controller 154. The laser outputs 156*a–n* are applied as input to an output distributor 162 that may include combining filters, and distribution optical amplifiers. The output distributor 162 includes a plurality of lambda group outputs 164. The MLS 38 may include an input 166 reference signal 96 as shown in FIG. 5.

In operation, each laser 150*a–n* generates an optical carrier signal under the control of the laser controller 154. A small percentage of the output optical carrier is fed back to the laser controller 154 via taps 158*a–n*. The conformity to the S-DWDM grid is monitored relative either a local reference or optionally to a received reference signal 96 and adjustments are made, on a continuous basis, to maintain conforming output of optical carriers.

Numerous modifications, variations and adaptations may be made to the particular embodiments of the invention described above without departing from the scope of the claims, which is defined in the claims.

What is claimed is:

1. A method of optical wavelength allocation in a photonic network comprising the steps of:
   generating a first plurality of unmodulated optical wavelengths at a first location in the network;
   selecting a predetermined one wavelength of the first plurality of unmodulated optical wavelengths;
   transmitting the predetermined one wavelength to a second location; and
   generating a second plurality of unmodulated optical wavelengths at a source of a second location in the network with reference to the predetermined one wavelength.

2. A method as claimed in claim 1 further comprising the steps of:
   forming a second group of wavelengths by grouping selected second wavelengths; and
   transmitting the second group of wavelengths to a third location in the network.

3. A method as claimed in claim 2 further comprising the steps of:
   modulating one wavelength of the second group of wavelengths at the third location; and
   passing the modulated one of the second group of wavelengths to the first location in the network.

4. A method as claimed in claim 2 further comprising the steps of:
   modulating one wavelength of the second group of wavelengths at the third location; end
   passing the modulated one of the second group of wavelengths to a fourth location in the network.

5. A method as claimed in claim 2 further comprising the step of modulating a wavelength of the first group of wavelengths at the first location.

6. Apparatus for optical wavelength allocation in a photonic network comprising:
   means for generating a first plurality of unmodulated optical wavelengths at a first location in the network;
   means for selecting a predetermined one wavelength of the first plurality of optical wavelengths; and
   means for transmitting the predetermined one wavelength to a second location for generating a second plurality of unmodulated optical wavelengths at a source of a second location in the network with reference to the predetermined one wavelength.

7. Apparatus as claimed in claim B further comprising:
   means for forming a second group of wavelengths by grouping selected second wavelengths; and
   means for transmitting the second group of wavelengths to a third location in the network.

8. Apparatus as claimed in claim 7 further comprising:
   means for modulating one wavelength of the second group of wavelengths at the third location; and
   means for passing the modulated one of the second group of wavelengths to the first location in the network.

9. Apparatus as claimed in claim 7 further comprising means for modulating one wavelength of the second group of wavelengths at the third location and passing the modulated one of the second group of wavelengths to a fourth location in the network.

10. A method of optical wavelength allocation in a photonic network comprising the steps of:
    generating a first plurality of unmodulated optical wavelengths at a first location in the network;

generating a second plurality of unmodulated optical wavelengths at a second location in the network; and in response to a path request from a third location, selecting one location adjacent to the third location from the first location and the second location; and setting up a connection between the third location and the one location to provide the optical wavelengths generated at the one location to the third location.

11. A method as claimed in claim 10 further comprising the steps of:

forming a group of wavelengths by grouping wavelengths selected from the unmodulated optical wavelengths; and transmitting the group of wavelengths to a third location in the network.

12. A method as claimed in claim 11 further comprising the steps of:

modulating one wavelength of the group of wavelengths at the third location; and passing the modulated one of the group of wavelengths to the first location in the network.

13. A method as claimed in claim 11 further comprising the steps of:

modulating one wavelength of the group of wavelengths at the third location; and passing the modulated one of the group of wavelengths to a fourth location in the network.

14. A method as claimed in claim 11 further comprising the step of modulating a wavelength of a first group of wavelengths selected from the first plurality of unmodulated optical wavelengths at the first location.

15. Apparatus for optical wavelength allocation in a photonic network comprising:

means for generating a first plurality of unmodulated optical wavelengths at a first location in the network;

means for generating a second plurality of unmodulated optical wavelengths at a second location in the network; and means for selecting one location adjacent to a third location from the first location and the second location in response to a path request from a third location, and setting up a connection between the third location and the one location to provide the optical wavelengths generated at the one location to the third location.

16. Apparatus as claimed in claim 15 further comprising:

means for forming a group of wavelengths by grouping wavelengths selected from the unmodulated optical wavelengths; and means for transmitting the group of wavelengths to a third location in the network.

17. Apparatus as claimed in claim 16 further comprising:

means for modulating one wavelength of the group of wavelengths at the third location; and means for passing the modulated one of the group of wavelengths to the first location in the network.

18. Apparatus as claimed in claim 16 further comprising means for modulating one wavelength of the group of wavelengths at the third location and means for passing the modulated one of the group of wavelengths to a fourth location in the network.

19. Apparatus as claimed in claim 16 further comprising means for modulating a wavelength of a first group of wavelengths selected from the first plurality of unmodulated optical wavelengths at the first location.

20. A method of optical wavelength allocation in a photonic network comprising the steps of:

generating a plurality of unmodulated optical wavelengths at a first location in the network;

forming a group of wavelengths by grouping selected wavelengths;

transmitting the group of wavelengths to a second location in the network;

modulating one of the group of wavelengths at the second location;

passing the group of wavelengths to a third location in the network;

modulating a second of the group of wavelengths at the third location; and passing the modulated second of the group of wavelengths back to the second location thereby establishing a two way communications path using two optical wavelengths between the second and third locations.

21. Apparatus for optical wavelength allocation in a photonic network comprising:

means for generating a plurality of unmodulated optical wavelengths at a first location in the network;

means for forming a group of wavelengths by grouping selected wavelengths;

means for transmitting the group of wavelengths to a second location in the network;

means for modulating one of the group of wavelengths at the second location;

means for passing the group of wavelengths to a third location in the network;

means for modulating a second of the group of wavelengths at the third location; and means for passing the modulated second of the group of wavelengths back to the second location whereby a two way communications path using two optical wavelengths between the second and third locations is established.

22. Apparatus as claimed in claim 21 wherein the means for generating a plurality of optical wavelength includes a multiple lambda source.

23. Apparatus as claimed in claim 22 wherein the optical wavelengths conform to a dense wavelength distributed multiplexing scheme.

24. Apparatus as claimed in claim 21 wherein the means for generating a plurality of optical wavelengths includes wavelength distributed multiplexers.

25. Apparatus as claimed in claim 24 wherein the wavelength distributed multiplexers are coarse relative to a dense wavelength distributed multiplexing scheme.

26. Apparatus as claimed in claim 6 wherein the generating means includes a multiple lambda source.

27. Apparatus as claimed in claim 26 wherein the optical wavelengths conform to a dense wavelength distributed multiplexing scheme.

28. Apparatus as claimed in claim 6 wherein the generating means includes wavelength distributed multiplexers.

29. Apparatus as claimed in claim 28 wherein the wavelength distributed multiplexers are coarse relative to a dense wavelength distributed multiplexing scheme.

30. A method as claimed in claim 10 further comprising the step of:

generating a reference wavelength;

providing the reference wavelength to the first location to generate the first plurality of unmodulated optical wavelengths at the first location; and providing the reference wavelength to the second location to generate the second plurality of unmodulated optical wavelengths at the second location.

31. A method as claimed in claim 10 further comprising the step of:

selecting a reference wavelength from the first plurality of unmodulated optical wavelengths;
providing the reference wavelength to the second location to generate the second plurality of unmodulated optical wavelengths at the second location.

32. Apparatus as claimed in claim 15 further comprising:
a source for generating a reference wavelength;
means for providing The reference wavelength to the first location to generate the first plurality of unmodulated optical wavelengths at the first location; and
means for providing the reference wavelength to the second location to generate the second plurality of unmodulated optical wavelengths at the second location.

33. Apparatus as claimed in claim 15 further comprising:
means for selecting a reference wavelength from the first plurality of unmodulated optical wavelengths;
means for providing the reference wavelength tome second location to generate the second plurality of unmodulated optical wavelengths at the second location.

34. Apparatus as claimed in claim 15 wherein the generating means includes a multiple lambda source.

35. Apparatus as claimed in claim 34 wherein the optical wavelengths conform to a dense wavelength distributed multiplexing scheme.

36. Apparatus as claimed in claim 15 wherein the generating means includes wavelength distributed multiplexers.

37. Apparatus as claimed in claim 36 wherein the wavelength distributed multiplexers are coarse relative to a dense wavelength distributed multiplexing scheme.

* * * * *

UNITED STATES PATENT AND TRADEMARK OFFICE
CERTIFICATE OF CORRECTION

| | |
|---|---|
| PATENT NO. | : 7,035,541 B2 |
| APPLICATION NO. | : 09/870665 |
| DATED | : April 25, 2006 |
| INVENTOR(S) | : Alan F. Graves and John H. Watkins |

It is certified that error appears in the above-identified patent and that said Letters Patent is hereby corrected as shown below:

Column 2
line 7, delete "a of" and insert --an--.

Column 4
line 33, delete "end" and insert --and--.

Column 4
line 64, delete "ti" and insert --to--.

Column 6
line 2, after "both" insert --the--.

Column 6
line 5, delete "elmer" and insert --either--.

Column 6
line 15, after "optical" insert --source--.

Column 6
line 27, delete "simi-" insert --Simi--.

Column 7
line 38, delete "that" and insert --than--.

Column 10
line 31, delete "end" and insert --and--.

Column 10
line 48, delete "B" and insert --6--.

Column 11
line 67, delete ":" and insert --;--.

Column 13
line 8, delete "The" and insert --the--.

UNITED STATES PATENT AND TRADEMARK OFFICE
CERTIFICATE OF CORRECTION

PATENT NO. : 7,035,541 B2
APPLICATION NO. : 09/870665
DATED : April 25, 2006
INVENTOR(S) : Alan F. Graves and John H. Watkins It is certified that error appears in the above-identified patent and that said Letters Patent is hereby corrected as shown below:

Column 14
line 1, delete "tome" and insert --to the--.

Signed and Sealed this

Nineteenth Day of June, 2007

JON W. DUDAS
*Director of the United States Patent and Trademark Office*